(12) United States Patent
Moon et al.

(10) Patent No.: US 11,877,700 B2
(45) Date of Patent: Jan. 23, 2024

(54) BLENDER BLADE ASSEMBLY

(71) Applicant: NuWave, LLC, Vernon Hills, IL (US)

(72) Inventors: Jung S. Moon, Long Grove, IL (US); Eubene Sin, Chicago, IL (US)

(73) Assignee: NuWave, LLC, Vernon Hills, IL (US)

( * ) Notice: Subject to any disclaimer, the term of this patent is extended or adjusted under 35 U.S.C. 154(b) by 39 days.

(21) Appl. No.: 17/653,595

(22) Filed: Mar. 4, 2022

(65) Prior Publication Data
US 2023/0276994 A1    Sep. 7, 2023

(51) Int. Cl.
*A47J 43/07*    (2006.01)

(52) U.S. Cl.
CPC .................... *A47J 43/0722* (2013.01)

(58) Field of Classification Search
CPC ..... A47J 43/07; A47J 43/0722; A47J 43/0711
See application file for complete search history.

(56) References Cited

U.S. PATENT DOCUMENTS

| | | | | |
|---|---|---|---|---|
| 2,771,111 A | * | 11/1956 | Seyfried | A47J 43/07 D7/378 |
| 3,216,473 A | * | 11/1965 | Dewenter | A47J 43/046 366/205 |
| 6,092,922 A | * | 7/2000 | Kett | A47J 43/0722 366/205 |
| 6,550,703 B2 | * | 4/2003 | Williams | A47J 43/0722 241/199.12 |
| 9,370,280 B2 | * | 6/2016 | Conti | B01F 27/808 |

FOREIGN PATENT DOCUMENTS

| | | | | |
|---|---|---|---|---|
| CN | 113749537 A | * | 12/2021 | ............... A47J 43/07 |
| GB | 2586644 A | * | 3/2021 | ............ A47J 27/004 |
| WO | WO-2013020570 A1 | * | 2/2013 | .......... A47J 43/0716 |
| WO | WO-2020249931 A1 | * | 12/2020 | ........... F16K 25/005 |
| WO | WO-2021075719 A1 | * | 4/2021 | ............ A47J 43/046 |

* cited by examiner

*Primary Examiner* — Bobby Yeonjin Kim
(74) *Attorney, Agent, or Firm* — Bishop, Diehl & Lee, Ltd.

(57) ABSTRACT

A blender blade having four tapered arms extending from a central body. Each arm includes a front cutting edge, a back edge, and a tipped end which exhibits a small, sharpened cutting edge at a slight angle from the front cutting edge. One of the arms is planar to the body, one arm includes a most preferred slight bend of about 6.0°, and the final two arms have a most preferred bend of about 16.7°.

6 Claims, 5 Drawing Sheets

BLENDER BLADE ASSEMBLY

TECHNICAL FIELD OF INVENTION

The present invention relates to high-quality blenders. More specifically, the invention relates to the design of the blender blade to achieve a better-quality blended product.

BACKGROUND OF THE INVENTION

One health trend which has gained significant traction with consumers is blending fruits and/or vegetables with other ingredients for a vitamin and nutrient rich drink. However, research has shown that the loss of nutrients in blended drinks due to reactions with oxygen in the air (i.e., oxidation) is increased during high-speed blending.

Further, with the addition of multiple ingredients to a blender container, air tends to force material in the blender container downward toward the bottom of the container below the blade. The blender blade is typically designed to pull material downward as well. All of this downward movement can lead to clumping and uneven processing.

Accordingly, removing air from the blender container before blending will help eliminate these problems. That is, by removing air, nutrients will be prevented from oxidation and material will expand, resulting in a finer processing of the ingredients. Further, providing a blending blade configured to help cut, chop and blend ingredients together without clumping also prevents oxidation and loss of nutrients.

Tests have shown that food flavor can be improved through blending to a consistent texture and homogeneity. These two features can be negatively impacted by poor blade design. Blender blade design has many factors to consider, including but not limited to blade material, blade thickness, number of cutting edges, and cutting angles.

Until the invention of the present application, these and other problems in the prior art went either unnoticed or unsolved by those skilled in the art. The present inventions provides a vacuum feature which removes air from the blender container without sacrificing portability features, designs, style or affordability.

SUMMARY OF THE INVENTION

There is disclosed herein an improved blender blade for a vacuum blender which avoids the disadvantages of prior blades and blender systems while affording additional structural, operating and food-quality advantages.

Generally speaking, the preferred blade is star-shaped, comprising four tapered arms extending from a central body. Each arm includes a front cutting edge, a back edge, and a tipped end which exhibits a small, sharpened cutting edge at a slight angle from the front cutting edge. One of the arms (arm A) is planar to the body, one arm (arm C) includes a most preferred slight bend of about 6.0°, and the final two arms (arms B and D) have a most preferred bend of about 16.7° opposite the direction of the bend in arm C. The angle of arm C may be in the range of from about 2.0° to about 9.0°. The angle of arms B and D may be in the range of from about 10.0° to about 22.0°. Preferably, arms A and C are opposite one another, while arms B and D are opposite one another.

In a specific embodiment, the disclosed blade mounts to a vertical shaft as part of a blender blade assembly. The assembly is positioned within a bottom surface of a blender container so as to couple to a blender motor. The assembly comprises various seals to prevent any blended food material from entering the assembly or from escaping the container.

A specific seal of the disclosed system is intended to prevent material from entering the blade assembly along the shaft. The seal has at least two contact points with the shaft including at least one contact point comprised of polytetrafluoroethylene (PTFE) and at least one comprised of a fluorocarbon elastomer material (FKM of FPM).

These and other aspects of the invention may be understood more readily from the following description and the appended drawings.

BRIEF DESCRIPTION OF THE DRAWINGS AND APPENDICES

For the purpose of facilitating an understanding of the subject matter sought to be protected, there are illustrated in the accompanying drawings and appendices, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
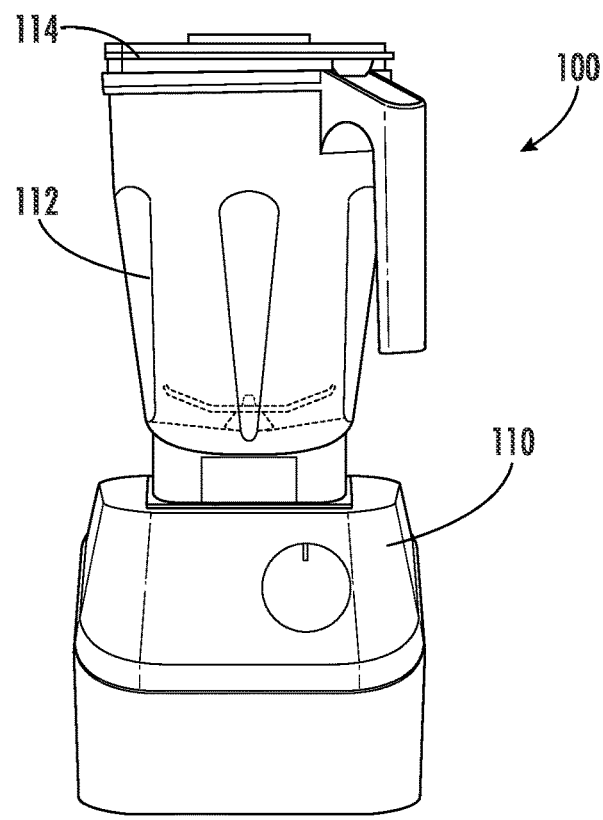
FIG. 1 is a front view of an embodiment of a vacuum blender in accordance with the present disclosure.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-10, there is illustrated a blender blade assembly, generally designated by the numeral 10. The particular illustrated blade assembly 10 is for use in a food blender and specifically for use in a vacuum blender 100, much like the one illustrated in FIG. 1. The vacuum blender 100 is comprised of a power base 110 including a blender motor (not shown) and a vacuum source (not shown), a blender carafe 112, and a carafe lid 114. However, while all the embodiments illustrated, as well as corresponding disclosures, are directed to a vacuum blender, it should be understood that the principles of the invention can be more broadly applied to any type of blender.

An exemplary vacuum blender is manufactured by the assignee of the present application, NuWave Inc., and is sold under the name "Moxie High Performance Vacuum Blender." This exemplary blender includes a 2.5 horsepower motor with 1,500 watts of power to provide commercial grade blending capabilities. The NuWave Moxie includes a stainless-steel metal drive system, jet engine bearings, a 64-ounce BPA-free blending jar and precision laser cut, hardened stainless steel blades.

As shown in FIGS. 2-5, the disclosed blade assembly 10 is generally comprised of a blender blade 12, a vertical shaft 14 which couples the blade 12 to a motor (not shown) within the blender base 110, an assembly housing 16 which encases a substantial portion of the shaft 14, and a seal 18 to prevent contamination of food within the blender container and leaking of food into the blade assembly 10. The disclosed blade assembly 10 is designed to pulverize ingredients at speeds as high as 17,000 RPM and can run as many as 15,000 cycles.

Figure 2:
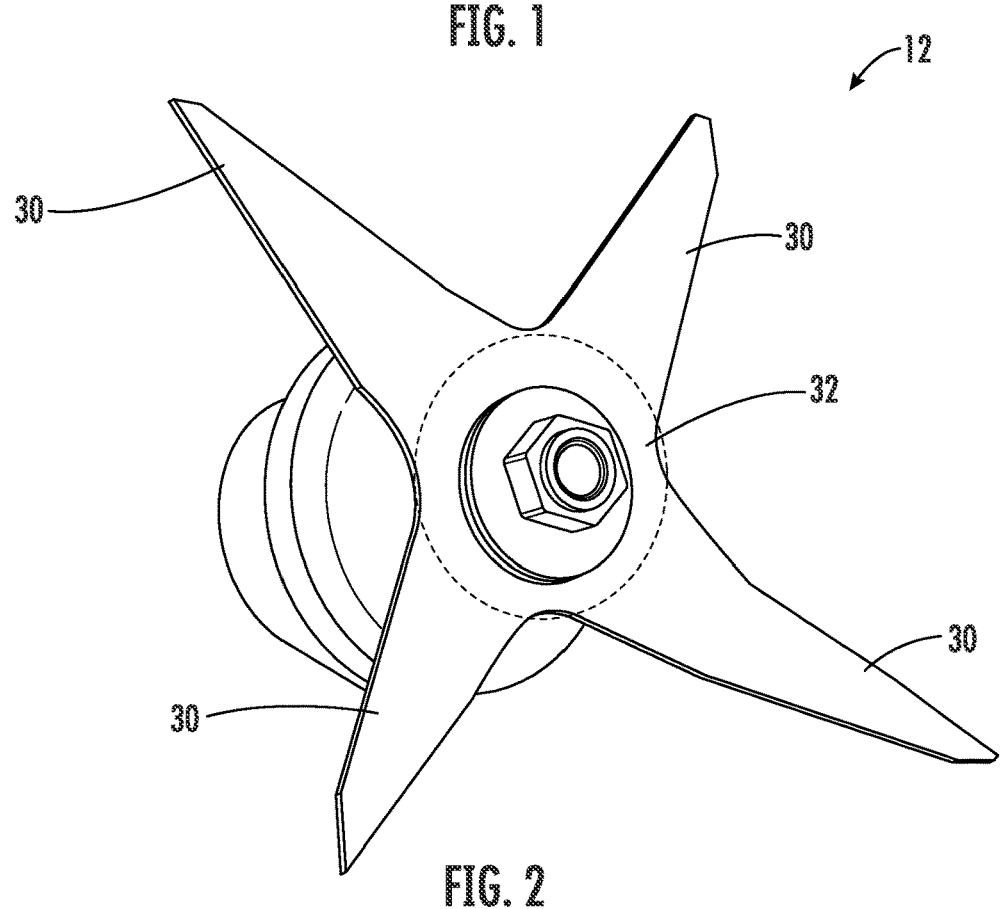
FIG. 2 is a perspective view of an embodiment of a blender blade assembly in accordance with the present disclosure.

As shown in FIG. 2, the blade 12 mounts to a vertical shaft 14 as part of the blender blade assembly 10. The assembly 10 is to be positioned within a bottom surface of a blender container or carafe 112 so as to couple to a blender motor (not shown). The assembly 10 comprises seal 18 to prevent any blended food material from entering the assembly 10 or from escaping the container 112.

Figure 3:
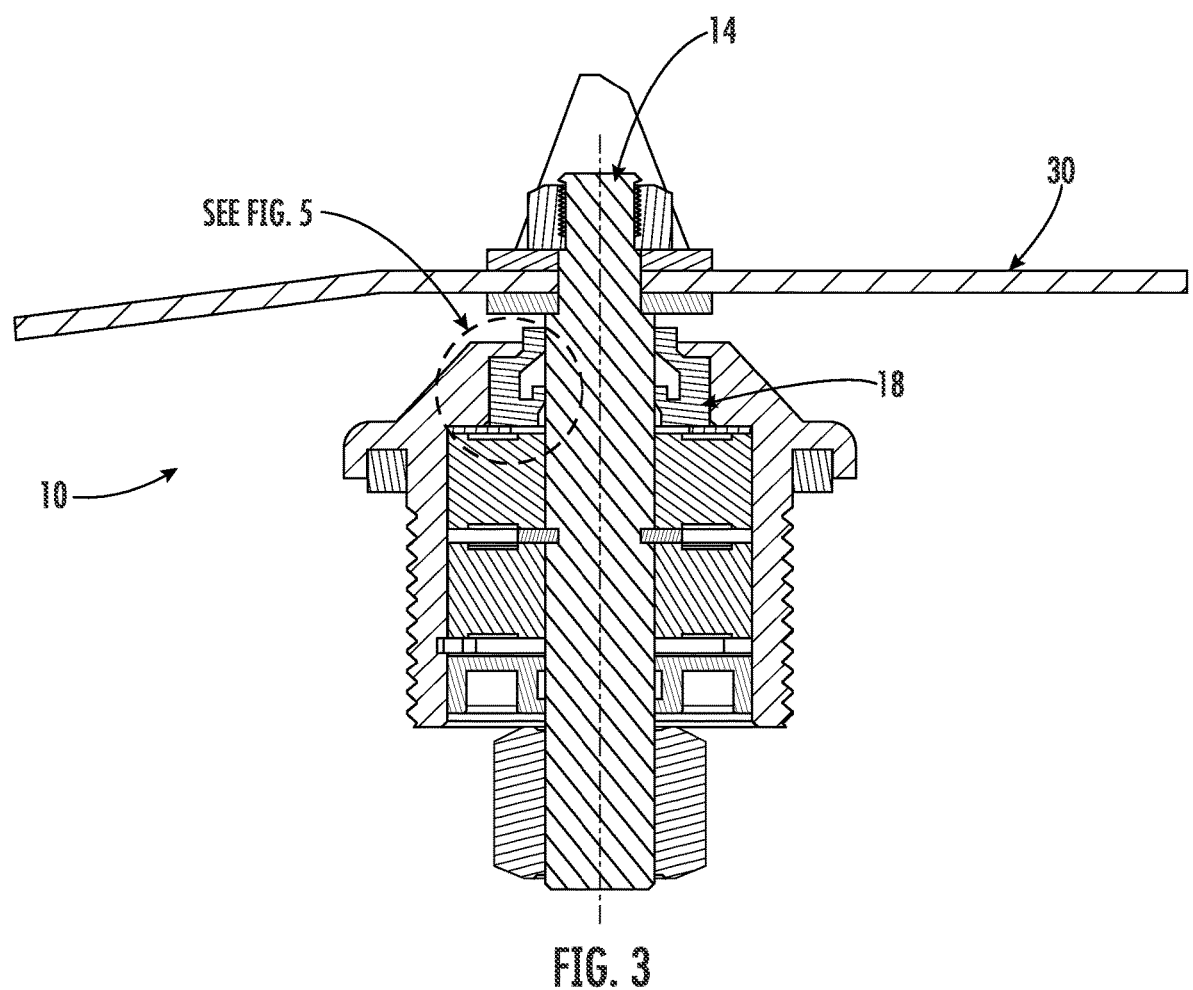
FIG. 3 is a cross sectional view of an embodiment of a blender blade assembly in accordance with the present disclosure.
Figure 4:
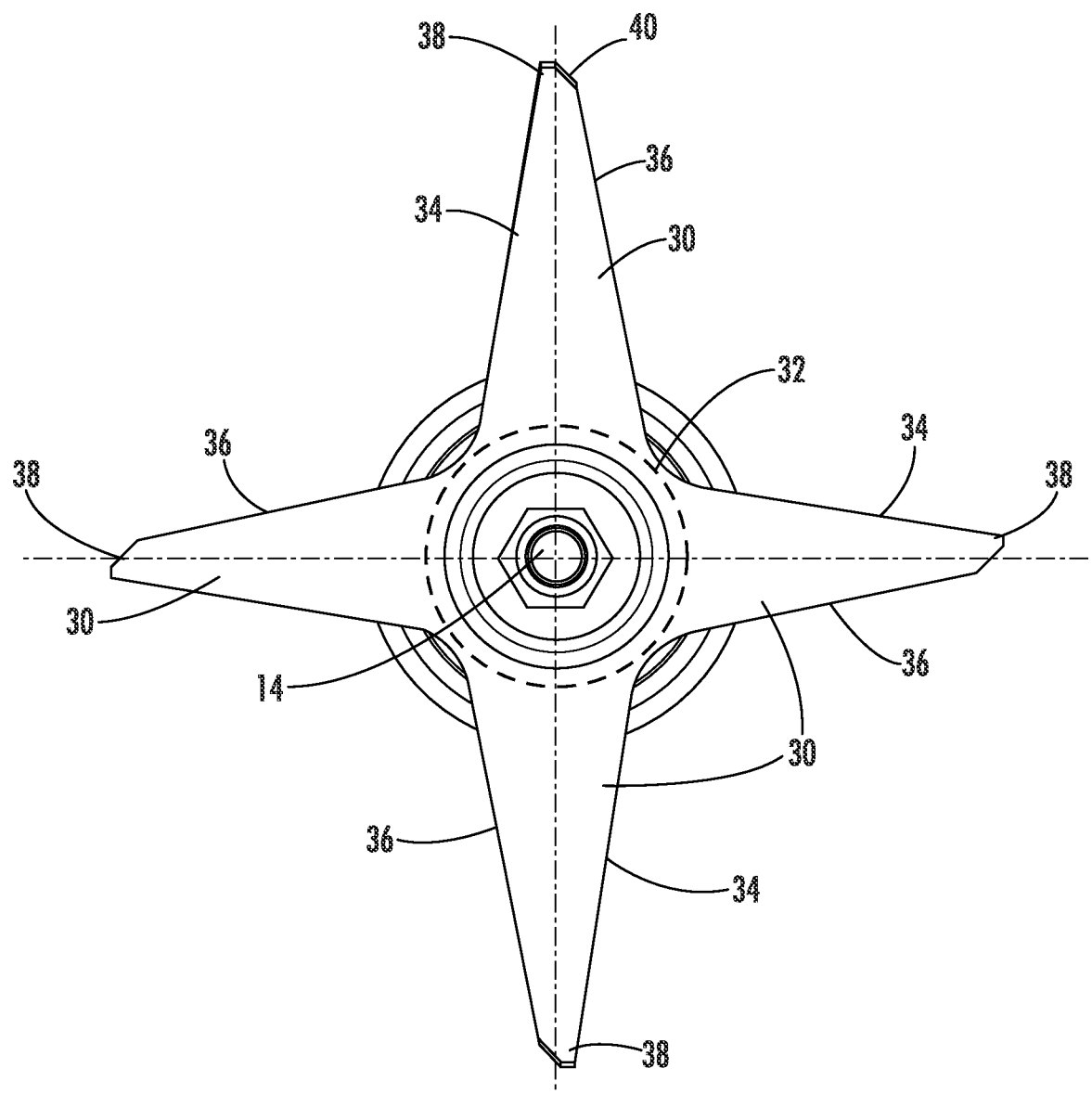
FIG. 4 is a top view of an embodiment of the blender blade assembly in accordance with the present disclosure.
Figure 5:
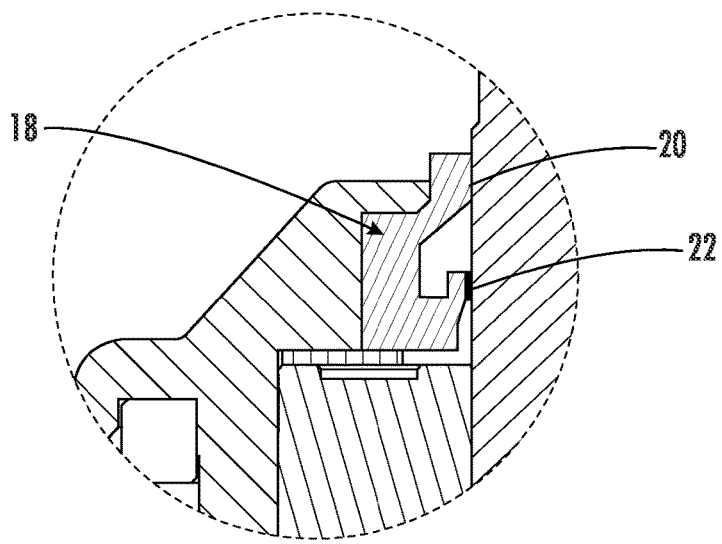
FIG. 5 is a cut-away close up of a highlighted section of the blender blade assembly of FIG. 3.
Figure 6:
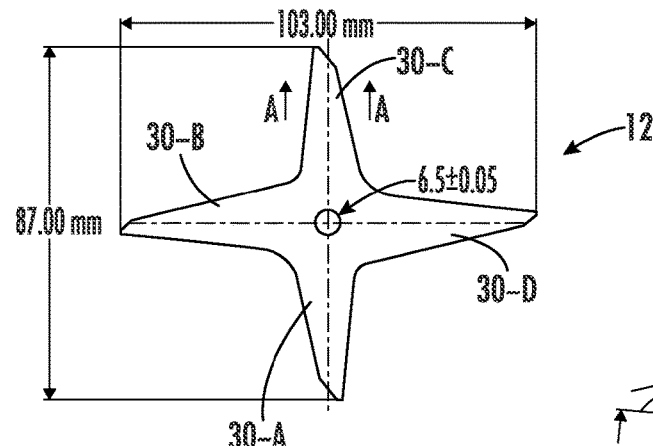
FIG. 6 is a top view of an embodiment of a blender blade in accordance with the present disclosure.
Figure 7:
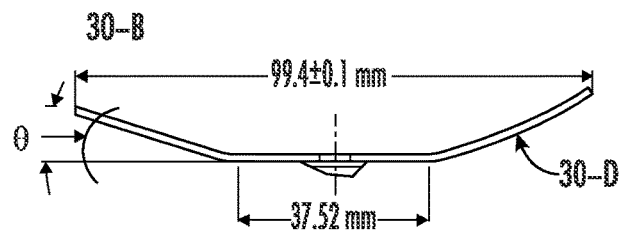
FIG. 7 is a side view of the blender blade of FIG. 6 rotated 90° along the X-axis.
Figure 8:
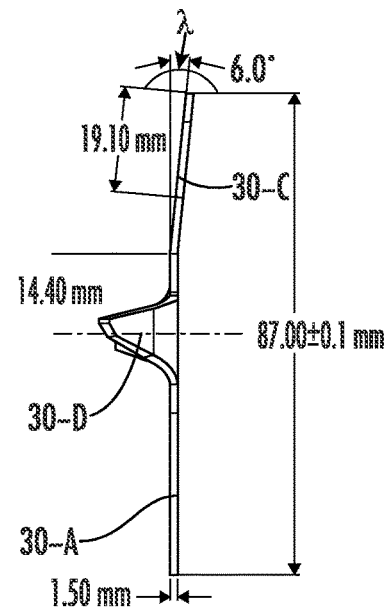
FIG. 8 is another side view of the blender blade of FIG. 6, rotated 90° along the Y-axis.
Figure 9:
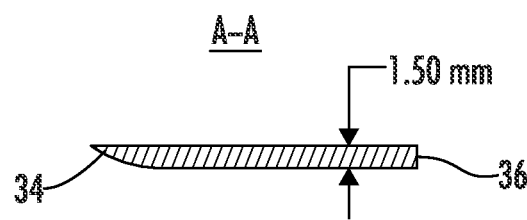
FIG. 9 is a cross-sectional view of the blade of FIG. 6 taken along line A-A.
Figure 10:
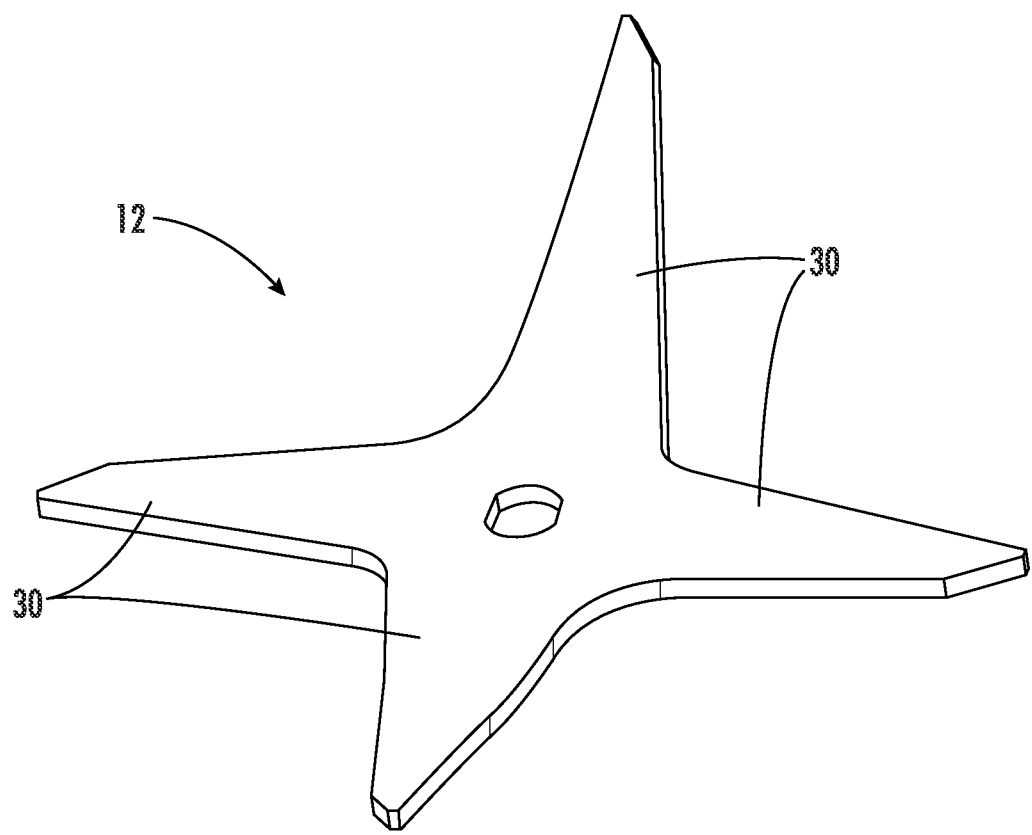
FIG. 10 is a perspective view of an embodiment of the blender blade in accordance with the present disclosure.

A particular seal 18 for the assembly 10 is illustrated in FIG. 5 from a highlighted section of FIG. 3. As previously noted, the seal 18 is intended to prevent material from entering the blade assembly 10 along the shaft 14. The illustrated seal 18 has at least two contact points with the shaft 14 including at least one contact point 20 comprised of a polytetrafluoroethylene (PTFE), such as TEFLON by Chemours Co., and at least one contact point 22 comprised of a fluorocarbon elastomer material (FKM or FPM), such as VITON by DuPont. Preferably, the seal 18 is comprised entirely of a fluorocarbon elastomer material, while a PTFE layer is provided on at least the lower contact point 20.

As can be seen in FIGS. 6-10, the blade 12 is star-shaped, comprising four tapered blending arms 30 extending from a central body 32. Each arm 30 includes a front cutting edge 34, a back edge 36, and a tipped end 38 which exhibits a small, sharpened cutting edge 40 at a slight angle from the front cutting edge 34. The blending arms have a thickness preferably within the range of 0.2 mm to 2.5 mm (±0.1 mm), except the front cutting edge which is in the range of 0.1 mm to 0.3 mm (±0.03 mm).

One of the blending arms (arm A) is planar to the central body 32 and one blending arm (arm C) has a slight bend in a middle section, the bend having an angle ($\Theta$) in the range of 2.0° to 9.0° (±0.5°) relative to the central body 32. Most preferably the angle ($\Theta$) of the bend is about) 6.0° (±0.5°) relative to the central body 32. The final two arms (arms B and D) also have a slight bend within the middle section, preferably these bends have an angle ($\lambda$) in the range of from about 10.0° to about 22.0° (±0.5°) relative to the central body 32. Most preferably, the angle ($\lambda$) of the bend is about 16.7° (±0.5°) relative to the planar central body 32 and opposite the direction of the bend in arm C. Preferably, arms A and C are opposite one another on the central body 32, while arms B and D are opposite one another.

It has been discovered that the present blender blade design performs blending operations much better than current prior art blender blades. The disclosed blade 12 not only improves the quality of blended foods, but as a result of the more effective blending of foods, it also actually improves the taste as well.

Several tests have been performed to compare the subject blender blade 12 against a prior art blender blade (1011), as detailed in the tables below. In the first test, reported in TABLE 1, the two blades were used to blend carrots (Part 1) and berries and apples (Part 2). Overall, the blender blade 10 of the present invention provided a more even consistency with less splatter than the prior art blade (1011).

TABLE 1

TEST #1: CARROT TEST

| | Blended Food | Time | Variable | Result |
| --- | --- | --- | --- | --- |
| Current Blade Assembly | 500 grams carrots 500 ml water | 2 mins under vacuum | Jar on reduced noise unit | even consistency |
| Prior Art Blade (1011) | 500 grams carrots 500 ml water | 2 mins under vacuum | Jar on regular unit | even consistency lid splatter evident |

TABLE 2

TEST #2: CARROT SOUP TEST

| | Blended Food | Time | Variable | Result |
| --- | --- | --- | --- | --- |
| Current Blade Assembly | 500 grams carrots 500 ml water | 7 mins under vacuum | Jar on reduced noise unit | even consistency 153.8° F. |
| Prior Art Blade (1011) | 500 grams carrots 500 ml water | 7 mins under vacuum | Jar on regular unit | even consistency lid splatter evident 158.0° F. |

TABLE 3

| | TEST #3: FROZEN BERRY ICE CREAM | | | |
|---|---|---|---|---|
| | Blended Food | Time | Variable | Result |
| Current Blade Assembly | 500 grams frozen fruit<br>200 grams banana<br>1 cup ice | 90 secs blend | +2 min blend | good consistency |
| Prior Art Blade (1011) | 500 grams frozen fruit<br>200 grams banana<br>1 cup ice | 90 secs blend | +2.5 min blend | good consistency |

TABLE 4

| | TEST #4: APPLE SMOOTHIE W/PLUNGER | | | |
|---|---|---|---|---|
| | Blended Food | Time | Variable | Result |
| Current Blade Assembly | 500 grams apples<br>1 cup ice | 90 secs blend | none | smooth consistency |
| Prior Art Blade (1011) | 500 grams apples<br>1 cup ice | 90 secs blend | none | not a smooth consistency |

TABLE 5

| | TEST #5: APPLE SMOOTHIE W/VACUUM | | | |
|---|---|---|---|---|
| | Blended Food | Time | Variable | Result |
| Current Blade Assembly | 500 grams apples<br>200 grams banana<br>1 cup ice | 90 secs blend with vacuum | none | thick consistency |
| Prior Art Blade (1011) | 500 grams apples<br>200 grams banana<br>1 cup ice | 90 secs blend with vacuum | none | thin consistency |

The following test data set forth in TABLES 6-10 document blender testing performed to compare additional prior art blades 0108(A & B) and 0109(A & B) against blade 12 of this application. As can be seen by the data, the 0109B blade and blade 12 of this application performed the best overall.

The various tests set forth in the following tables were performed in accordance with industry standards, as would be understood by those of skill in the art.

TABLE 6

| Pulp weight Test | |
|---|---|
| Blade | Pulp Weight (g) |
| 0108A | 364 |
| 0108B | 283 |
| 0109A | 290 |
| 0109B | 370 |
| Current Blade | 320 |

TABLE 7

| Blend Test #1 | | |
|---|---|---|
| Blade | Procedure | Observations |
| 0108A | 250 grams frozen berries<br>250 ml water | A lot of free spin, thick consistency |
| 0108B | 60 secs blend under vacuum | Good blend but a lot of splatter midway through, some chunks |
| 0109A | | Lots of splatter |
| 0109B* | | Smooth and consistent blend, good color |
| Current Blade* | | Smooth and consistent blend, good color |

*Rated best blade

TABLE 8

| Blend Test #2 | | |
|---|---|---|
| Blade | Procedure | Observations |
| 0108A | 250 grams frozen berries<br>250 ml water<br>60 secs blend under vacuum | A lot of free spin, thick consistency, lots of chunks |
| 0108B | | Inconsistent blend, free spin, chunks |

TABLE 8-continued

Blend Test #2

| Blade | Procedure | Observations |
|---|---|---|
| 0109A | | Lots of splatter |
| 0109B* | | Smooth blend |
| Current Blade* | | Good and consistent blend |

*Rated best blade

The culmination of the above data provides substantial evidence that the current blade design is superior to prior art blades.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A blender blade assembly comprising: a blender blade comprising: a central body having an axis of rotation; a plurality of blending arms equidistantly spaced and radially extending from the central body, wherein each blending arm comprises a base adjoining the central body, an end distal from the central body, a middle section between the base and the end, a front cutting edge, a back edge opposite the front cutting edge, and a thickness within the range of 0.2 to 2.5 millimeters; wherein at least one first blending arm is planar to the central body, at least one second blending arm includes a bend in the middle section at an angle relative to the central body in the range of about 2° to 9° in a first direction, and each of at least two third blending arms include a bend in the respective middle sections at an angle relative to the central body in the range of about 10° to 22° in a direction opposite the first direction; a shaft coupled to the blender blade at a first end and configured to couple with a blender motor at a second end opposite the first end; a housing encasing a substantial portion of the shaft; a seal contacting the shaft at two points including an entry point to the housing to prevent any blended food material from entering the assembly housing, wherein a first contact point of the seal is comprised of polytetrafluoroethylene (PTFE) and a second contact point of the seal is comprised of a fluorocarbon elastomer material.

2. The blender blade of claim 1, wherein the angle of the bend of the at least one second blending arm is in the range of from about 5° to about 7°.

3. The blender blade assembly of claim 2, wherein the angle of the bend of the at least one second blending arm is about 6°.

4. The blender blade assembly of claim 1, wherein the angle of the bend of the at least two third blending arms is in the range of from about 15° to 18°.

5. The blender blade assembly of claim 4, wherein the angle of the bend of the at least two third blending arms is about 16.7°.

6. The blender blade assembly of claim 1, wherein the thickness of the front cutting edge is in the range of from about 0.1 mm to 0.3 mm.

* * * * *